(12) United States Patent
Sheaffer et al.

(10) Patent No.: US 11,435,116 B2
(45) Date of Patent: Sep. 6, 2022

(54) TWO STEP OIL MOTIVE EDUCTOR SYSTEM

(71) Applicant: Johnson Controls Technology Company, Auburn Hills, MI (US)

(72) Inventors: Bryson L. Sheaffer, York, PA (US); Paul W. Snell, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/650,229

(22) PCT Filed: Sep. 21, 2018

(86) PCT No.: PCT/US2018/052256
§ 371 (c)(1),
(2) Date: Mar. 24, 2020

(87) PCT Pub. No.: WO2019/060752
PCT Pub. Date: Mar. 28, 2019

(65) Prior Publication Data
US 2020/0224929 A1 Jul. 16, 2020

Related U.S. Application Data

(60) Provisional application No. 62/562,895, filed on Sep. 25, 2017.

(51) Int. Cl.
*F25B 31/00* (2006.01)
*F25B 1/00* (2006.01)
(Continued)

(52) U.S. Cl.
CPC .............. *F25B 1/00* (2013.01); *F25B 13/00* (2013.01); *F25B 31/004* (2013.01); *F25B 41/00* (2013.01);
(Continued)

(58) Field of Classification Search
CPC .............. F25B 11/00; F25B 49/025; F25B 2341/0014; F25B 2341/0015; F25B 2341/0016
See application file for complete search history.

(56) References Cited

U.S. PATENT DOCUMENTS 1,910,840 A 5/1933 Kagi
2,770,106 A 11/1956 Moody
(Continued)

FOREIGN PATENT DOCUMENTS

CN 100342186 C 10/2007
CN 101762109 A 6/2010
(Continued)

OTHER PUBLICATIONS

International Search Report and Written Opinion on International Patent Application No. PCT/US2018/052256 dated Jan. 3, 2019, 16 pages.

(Continued)

*Primary Examiner* — Jerry-Daryl Fletcher
*Assistant Examiner* — Daniel C Comings
(74) *Attorney, Agent, or Firm* — Fletcher Yoder, P.C.

(57) ABSTRACT

An eductor system for a chiller assembly is provided. The system includes a first and a second eductor. The first eductor includes a first suction inlet that receives a first oil and refrigerant mixture from a plenum of a compressor, a first motive inlet that receives a first motive fluid from an oil sump, and a first outlet that discharges a first outlet mixture to the oil sump. The first outlet mixture includes both the first oil and refrigerant mixture and the first motive fluid. The second eductor includes a second suction inlet that receives a second oil and refrigerant mixture from an evaporator, a second motive inlet that receives a second motive fluid from a condenser, and a second outlet that discharges a second outlet mixture to the plenum of the compressor. The second (Continued)

outlet mixture includes both the second oil and refrigerant mixture and the second motive fluid.

20 Claims, 5 Drawing Sheets

(51) Int. Cl.
*F25B 13/00* (2006.01)
*F25B 41/00* (2021.01)
*F25B 49/02* (2006.01)

(52) U.S. Cl.
CPC ..... *F25B 49/025* (2013.01); *F25B 2341/0014* (2013.01); *F25B 2341/0015* (2013.01); *F25B 2341/0016* (2013.01); *F25B 2600/0253* (2013.01)

(56) References Cited

U.S. PATENT DOCUMENTS

| | | | |
|---|---|---|---|
| 2,921,445 A | 1/1960 | Ashley et al. | |
| 2,975,613 A | 3/1961 | Heidorn | |
| 3,149,478 A | 9/1964 | Anderson et al. | |
| 3,645,112 A | 2/1972 | Mount et al. | |
| 3,670,519 A | 6/1972 | Newton | |
| 3,777,509 A | 12/1973 | Muench | |
| 4,182,137 A | 1/1980 | Erth | |
| 4,558,573 A | 12/1985 | La Monica | |
| 4,671,081 A | 6/1987 | Fujiwara et al. | |
| 4,843,837 A | 7/1989 | Ogawa et al. | |
| 4,938,664 A | 7/1990 | Zinsmeyer | |
| 5,165,248 A | 11/1992 | Sishtla | |
| 5,343,711 A | 9/1994 | Kornhauser et al. | |
| 5,461,883 A | 10/1995 | Terasaki | |
| 5,481,887 A | 1/1996 | Terasaki | |
| 5,606,872 A | 3/1997 | Terasaki | |
| 5,761,914 A | 6/1998 | Carey et al. | |
| 6,032,472 A | 3/2000 | Heinrichs et al. | |
| 6,070,421 A | 6/2000 | Petrovich et al. | |
| 6,170,286 B1 | 1/2001 | Keuper | |
| 6,182,467 B1 | 2/2001 | Zhong et al. | |
| 6,216,474 B1 | 4/2001 | Sishtla | |
| 6,233,967 B1 | 5/2001 | Seewald et al. | |
| 6,237,353 B1 | 5/2001 | Sishtla et al. | |
| 6,244,059 B1 | 6/2001 | Hill | |
| 6,460,371 B2 | 10/2002 | Kawada | |
| 6,477,857 B2 | 11/2002 | Takeuchi et al. | |
| 6,506,031 B2 | 1/2003 | Sishtla | |
| 6,516,627 B2 | 2/2003 | Ring et al. | |
| 6,574,987 B2 | 6/2003 | Takeuchi et al. | |
| 6,622,495 B2 * | 9/2003 | Nishii .................. | F04F 5/04 62/84 |
| 6,698,221 B1 | 3/2004 | You | |
| 6,834,514 B2 | 12/2004 | Takeuchi et al. | |
| 6,862,897 B2 | 3/2005 | Makida et al. | |
| 6,868,679 B2 | 3/2005 | Yamaguchi et al. | |
| 6,868,695 B1 | 3/2005 | Dingel et al. | |
| 7,059,150 B2 | 6/2006 | Komatsu et al. | |
| 7,086,248 B2 | 8/2006 | Sakai et al. | |
| 7,181,928 B2 | 2/2007 | De Larminat | |
| 7,779,647 B2 | 8/2010 | Takeuchi et al. | |
| 7,870,758 B2 | 1/2011 | Nishijima et al. | |
| 8,021,127 B2 | 9/2011 | De Larminat | |
| 8,047,018 B2 | 11/2011 | Ikegami et al. | |
| 8,156,757 B2 * | 4/2012 | Doty .................. | H02K 7/09 62/505 |
| 8,397,534 B2 | 3/2013 | Doty et al. | |
| 8,434,323 B2 | 5/2013 | Welch et al. | |
| 8,465,265 B2 | 6/2013 | De Larminat | |
| 8,572,970 B2 | 11/2013 | Matteson et al. | |
| 8,640,491 B2 | 2/2014 | Shoulders | |
| 8,769,952 B2 | 7/2014 | Cogswell et al. | |
| 8,776,539 B2 | 7/2014 | Verma et al. | |
| 8,959,950 B2 | 2/2015 | Doty et al. | |
| 8,991,201 B2 | 3/2015 | Ikegami et al. | |
| 9,243,827 B2 | 1/2016 | Kim et al. | |
| 9,291,166 B2 | 3/2016 | De Larminat et al. | |
| 9,394,921 B2 | 7/2016 | Yamada et al. | |
| 9,464,832 B2 | 10/2016 | Higashiiue | |
| 2002/0184903 A1 | 12/2002 | Takeuchi et al. | |
| 2003/0167793 A1 | 9/2003 | Honda et al. | |
| 2007/0000262 A1 | 1/2007 | Ikegami et al. | |
| 2007/0271956 A1 | 11/2007 | Smith et al. | |
| 2010/0006265 A1 | 1/2010 | De Larminat et al. | |
| 2010/0313582 A1* | 12/2010 | Oh .................. | F25B 41/00 62/115 |
| 2011/0005237 A1 | 1/2011 | Matteson et al. | |
| 2012/0116594 A1 | 5/2012 | Aidoun et al. | |
| 2012/0297818 A1 | 11/2012 | Toyama et al. | |
| 2013/0061628 A1 | 3/2013 | Moon | |
| 2013/0186128 A1 | 7/2013 | Kim et al. | |
| 2013/0302184 A1 | 11/2013 | Sishtla | |
| 2014/0057103 A1 | 2/2014 | Mozsgai et al. | |
| 2016/0003511 A1 | 1/2016 | Esformes et al. | |
| 2016/0047575 A1* | 2/2016 | Jonsson .................. | F25B 41/00 62/117 |
| 2016/0209094 A1 | 7/2016 | Yokoyama et al. | |
| 2016/0363356 A1 | 12/2016 | Hinde et al. | |

FOREIGN PATENT DOCUMENTS

| | | |
|---|---|---|
| CN | 103003645 A | 3/2013 |
| CN | 104567089 A | 4/2015 |
| CN | 105143787 A | 12/2015 |
| CN | 108571835 A | 9/2018 |
| EP | 1 119 732 A1 | 8/2001 |
| EP | 1 705 437 | 9/2006 |
| EP | 2 754 980 | 3/2016 |
| FR | 2128431 A1 | 10/1972 |
| JP | S507750 U | 1/1975 |
| JP | S6375446 A | 4/1988 |
| JP | S6396450 A | 4/1988 |
| JP | H05505865 A | 8/1993 |
| JP | H11230098 A | 8/1999 |
| JP | 2006503222 A | 1/2006 |
| JP | 2016020783 A | 2/2016 |
| JP | 2016194377 A | 11/2016 |
| KR | 20150071874 A | 6/2015 |
| RU | 2007669 C1 | 2/1994 |
| WO | WO-2012/037021 | 3/2012 |
| WO | WO-2013/039572 A1 | 3/2013 |
| WO | WO-2014/039155 A2 | 3/2014 |
| WO | WO-2014/084989 A2 | 6/2014 |
| WO | WO-2014/089551 A1 | 6/2014 |
| WO | WO-2014/117015 A1 | 7/2014 |
| WO | WO-2015/053939 A1 | 4/2015 |

OTHER PUBLICATIONS

Taiwanese Office Action for Patent Application No. TW107133526 dated Apr. 11, 2019, 13 pages.
Chinese Office Action for CN Application No. 201880075142.0, dated Apr. 2, 2021,13 pgs.
Japanese Office Action for JP Application No. 2020-517153, dated Jun. 7, 2022. 8 pgs.
Korean Office Action for KR Application No. 10-2020-7011874, dated Jul. 8, 2022, 5 pgs.

* cited by examiner

TWO STEP OIL MOTIVE EDUCTOR SYSTEM

CROSS-REFERENCE TO RELATED PATENT APPLICATION

This application is a U.S. National Stage Application of PCT/US2018/052256, filed Sep. 21, 2018, which claims the benefit of and priority to U.S. Provisional Patent Application No. 62/562,895 filed Sep. 25, 2017, both of which are incorporated herein by reference in their entirety.

BACKGROUND

Buildings can include heating, ventilation and air conditioning (HVAC) systems.

SUMMARY

One implementation of the present disclosure is an eductor system for a chiller assembly. The eductor system includes a first eductor and a second eductor. The first eductor includes a first suction inlet that receives a first oil and refrigerant mixture from a plenum of a compressor, a first motive inlet that receives a first motive fluid from an oil sump, and a first outlet that discharges a first outlet mixture to the oil sump. The first outlet mixture includes both the first oil and refrigerant mixture and the first motive fluid. The second eductor includes a second suction inlet that receives a second oil and refrigerant mixture from an evaporator, a second motive inlet that receives a second motive fluid from a condenser, and a second outlet that discharges a second outlet mixture to the plenum of the compressor. The second outlet mixture includes both the second oil and refrigerant mixture and the second motive fluid.

The first motive fluid can be pressurized oil. The second motive fluid can be a pressurized refrigerant gas. A percentage of oil in the first oil and refrigerant mixture can range from 33% to 50%. A percentage of oil in the second oil and refrigerant mixture can range from 0.5% to 2%. The refrigerant can be R1233zd.

Another implementation of the present disclosure is a chiller assembly. The chiller assembly includes a centrifugal compressor driven by a hermetically sealed induction motor, a condenser, and an evaporator. The centrifugal compressor, the condenser, and the evaporator are connected in a closed refrigerant loop. The chiller assembly further includes an oil motive eductor system. The oil motive eductor system includes an oil sump, a first eductor, and a second eductor. The first eductor includes a first suction inlet, a first motive inlet configured to receive a first motive fluid from the oil sump, and a first outlet. The second eductor includes a second suction inlet, a second motive inlet configured to receive a second motive fluid from the condenser, and a second outlet.

The first suction inlet can receive a first oil and refrigerant mixture from a plenum of the centrifugal compressor. A percentage of oil in the first oil and refrigerant mixture can range from 33% to 50%. The first outlet can discharge a first outlet mixture to the oil sump. The first outlet mixture can include the first oil and refrigerant mixture and the first motive fluid. The first motive fluid can be pressurized oil.

The second suction inlet can receive a second oil and refrigerant mixture from the evaporator. A percentage of oil in the second oil and refrigerant mixture can range from 0.5% to 2%. The second outlet can be configured to discharge a second outlet mixture to a plenum of the centrifugal compressor. The second outlet mixture can include the second oil and refrigerant mixture and the second motive fluid. The second motive fluid can be a pressurized refrigerant gas. The refrigerant can be R1233zd.

Yet another implementation of the present disclosure is a chiller assembly. The chiller assembly includes a compressor driven by a motor, a condenser, and an evaporator. The compressor, the condenser, and the evaporator are connected in a closed refrigerant loop. The chiller assembly further includes an oil motive eductor system. The oil motive eductor system includes an oil sump, a first eductor, and a second eductor. The first eductor includes a first suction inlet configured to receive a first oil and refrigerant mixture from a plenum of the compressor, a first motive inlet configured to receive a pressurized oil motive fluid from the oil sump, and a first outlet configured to discharge a first outlet mixture to the oil sump. The second eductor includes a second suction inlet, a second motive inlet, and a second outlet.

The second suction inlet can receive a second oil and refrigerant mixture from the evaporator, the second motive inlet can receive a second motive fluid from the condenser, and the second outlet can discharge a second outlet mixture to the plenum of the compressor. The second motive fluid can be pressurized refrigerant gas. A percentage of oil in the first oil and refrigerant mixture can range from 33% to 50%, and a percentage of oil in the second oil and refrigerant mixture can range from 0.5% to 2.0%.

DETAILED DESCRIPTION

The present disclosure relates generally to a two step oil motive eductor system for use in a chiller assembly. Chiller assemblies may include, among other components, an evaporator, a compressor, a condenser and an expansion device in a closed refrigerant loop. The compressor may include an impeller driven by a motor, and the motor may be supported by oil lubricated bearings that maintain the position of the motor shaft as it rotates and drives the impeller. When the motor is hermetically sealed (e.g., the motor is within the closed refrigerant loop and an airtight housing encapsulates both the compressor and the motor), the bearings must be lubricated and cooled by an internal oil supply system. An internal oil supply system results in the unavoidable exposure of lubricating oil to refrigerant. The presence of lubricating oil in refrigerant reduces the heat transfer capacity of the refrigerant. Meanwhile, the presence of refrigerant in lubricating oil reduces the viscosity of the lubricating oil and can cause cavitation in oil systems. Thus, the oil supply system of a hermetically sealed compressor assembly must be designed to limit the harmful effects caused by the mixing of lubricating oil and refrigerant.

Lubricating oil may be circulated through an internal oil supply system using one or more eductors. Eductors, also known as jet pumps, are pumps without moving parts that can utilize a fluid to perform the work of pumping another fluid according to the principles of the Venturi effect. The Venturi effect is the reduction in fluid pressure (and corresponding increase in velocity) that can result when a fluid flows through a constricted section of a pipe. The fluid being pumped through the eductor is called the suction fluid, while the fluid doing the work is termed the motive fluid and may be a liquid (e.g., oil) or a gas. Avoidance of mechanical pumps in a chiller assembly can be beneficial due to a reduction in the complexity in the system and a lower risk of reliability issues due to the lack of moving parts.

Operation of an eductor can be as follows: pressurized motive fluid enters an eductor through a motive inlet and enters a nozzle. The nozzle causes the motive fluid to accelerate as it passes through a converging portion of the nozzle. As the motive fluid leaves the nozzle, it enters a suction chamber where it mixes with the suction fluid. Friction between the two types of fluids forces the mixture into a diffuser section which lowers the pressure in the suction chamber and pulls additional suction fluid into the chamber via a suction inlet. The diffuser section can be shaped to reduce the velocity of the fluid mixture, correspondingly increasing its pressure at the eductor exit.

Chiller assemblies operate at a refrigerant head pressure that is dependent on a variety of factors, including the local weather conditions of the chiller assembly installation site, and the properties of the refrigerant. For example, the gauge pressure of a typical industrial chiller assembly may range from a minimum of 30 psi to a maximum of 250 psi. During low head operation (e.g., when a low pressure refrigerant is used in the chiller assembly), a gauge pressure differential between the evaporator and the condenser may be 20 psi or less, resulting in a substantial reduction in performance of gas motive eductors. If the gauge pressure differential between the evaporator and the condenser drops below 5 psi, gas motive eductors may cease to function.

In order to overcome low head pressure conditions and move enough refrigerant to reclaim lost oil, large eductor orifices can be used. However, when a gas eductor with a large orifice is discharged into an oil sump, the overall refrigerant flow through the sump can become excessive. Oil motive eductors can work well to overcome a lack of head pressure because they operate at a constant motive pressure, but they are sensitive to mixing shock when refrigerant enters the diffuser portion of the eductor, causing the eductor to choke. A system that removes a large amount of refrigerant load from the oil sump to result in more stable oil suction conditions would be useful.

Figure 1:
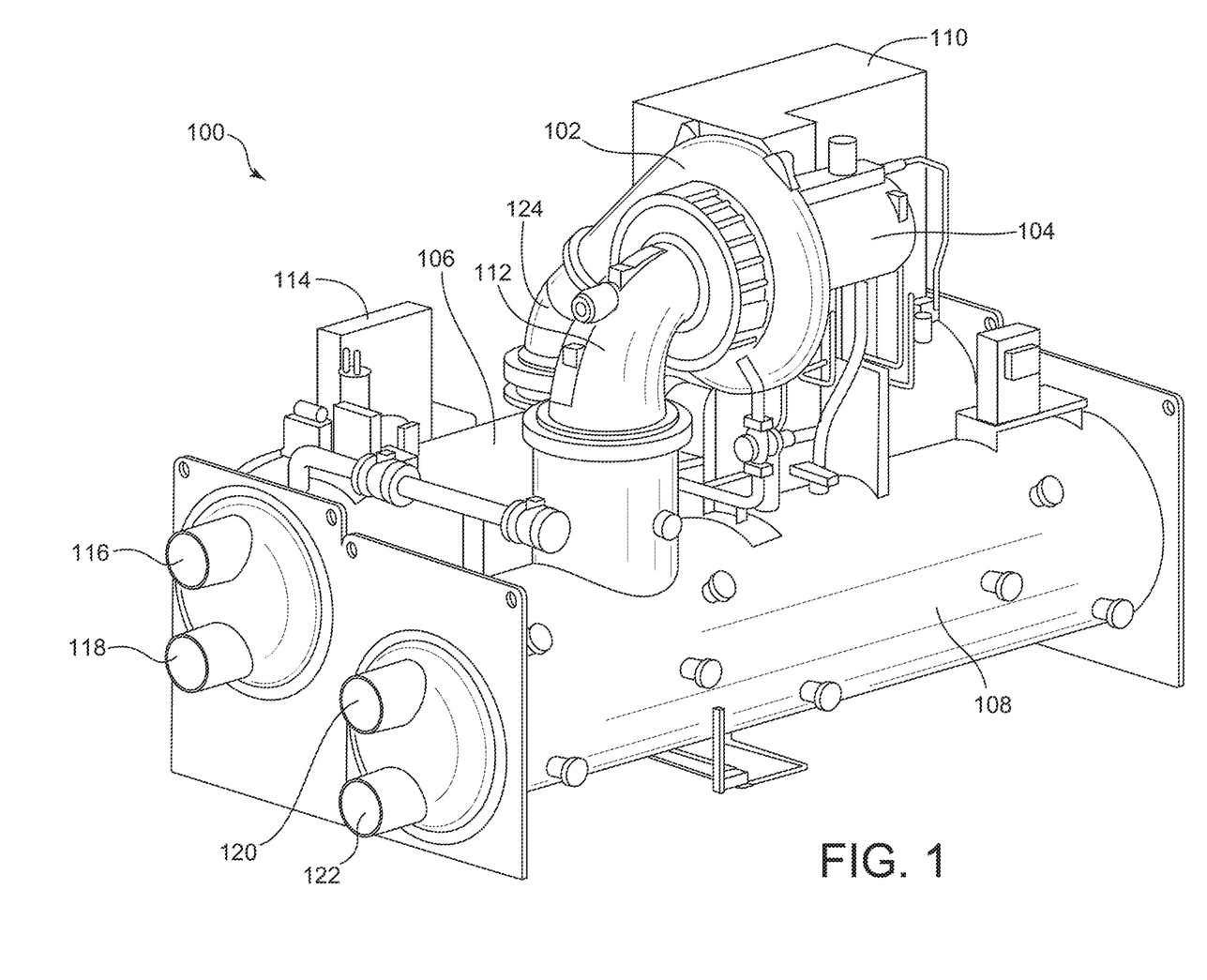
FIG. 1 is a perspective view drawing of a chiller assembly, according to some embodiments.
Figure 2:
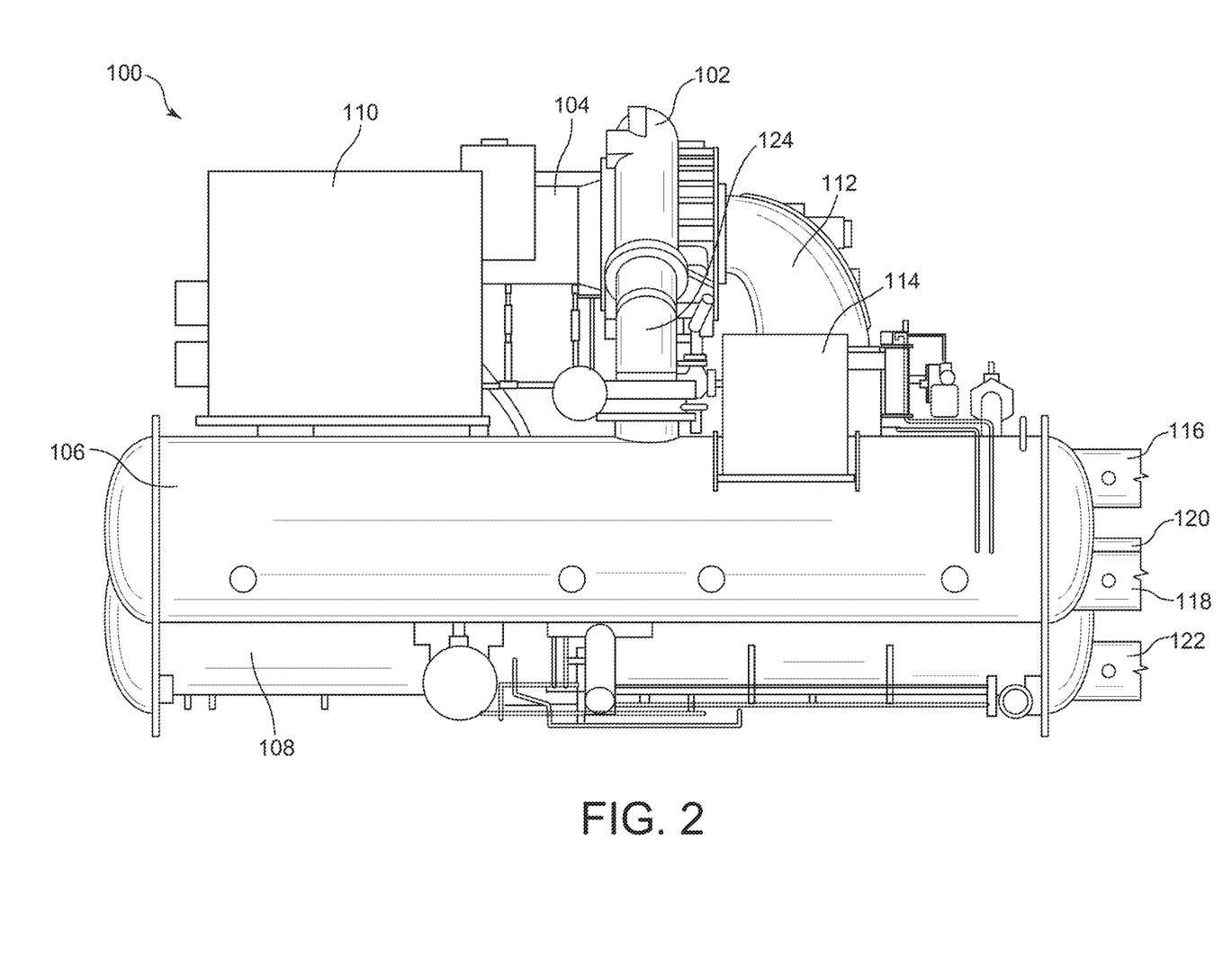
FIG. 2 is an elevation view drawing of the chiller assembly of FIG. 1, according to some embodiments.

Referring generally to the FIGURES, a chiller assembly having a two step oil motive edutor system is shown. Referring specifically to FIGS. 1-2, an example implementation of a chiller assembly 100 is depicted. Chiller assembly 100 is shown to include a compressor 102 driven by a motor 104, a condenser 106, and an evaporator 108. A refrigerant is circulated through chiller assembly 100 in a vapor compression cycle. Chiller assembly 100 can also include a control panel 114 to control operation of the vapor compression cycle within chiller assembly 100.

Motor 104 can be powered by a variable speed drive (VSD) 110. VSD 110 receives alternating current (AC) power having a particular fixed line voltage and fixed line frequency from an AC power source (not shown) and provides power having a variable voltage and frequency to motor 104. Motor 104 can be any type of electric motor than can be powered by a VSD 110. For example, motor 104 can be a high speed induction motor. Compressor 102 is driven by motor 104 to compress a refrigerant vapor received from evaporator 108 through suction line 112 and to deliver refrigerant vapor to condenser 106 through a discharge line 124. Compressor 102 can be a centrifugal compressor, a screw compressor, a scroll compressor, or any other type of suitable compressor. For example, in the implementation depicted in FIG. 4, compressor 102 is a centrifugal compressor.

Evaporator 108 includes an internal tube bundle, a supply line 120 and a return line 122 for supplying and removing a process fluid to the internal tube bundle. The supply line 120 and the return line 122 can be in fluid communication with a component within a HVAC system (e.g., an air handler) via conduits that that circulate the process fluid. The process fluid is a chilled liquid for cooling a building and can be, but is not limited to, water, ethylene glycol, calcium chloride brine, sodium chloride brine, or any other suitable liquid. Evaporator 108 is configured to lower the temperature of the process fluid as the process fluid passes through the tube bundle of evaporator 108 and exchanges heat with the refrigerant. Refrigerant vapor is formed in evaporator 108 by the refrigerant liquid delivered to the evaporator 108 exchanging heat with the process fluid and undergoing a phase change to refrigerant vapor.

Refrigerant vapor delivered by compressor 102 to condenser 106 transfers heat to a fluid. Refrigerant vapor condenses to refrigerant liquid in condenser 106 as a result of heat transfer with the fluid. The refrigerant liquid from condenser 106 flows through an expansion device and returns to evaporator 108 to complete the refrigerant cycle of the chiller assembly 100. Condenser 106 includes a supply line 116 and a return line 118 for circulating fluid between the condenser 106 and an external component of the HVAC system (e.g., a cooling tower). Fluid supplied to the condenser 106 via return line 118 exchanges heat with the refrigerant in the condenser 106 and is removed from the condenser 106 via supply line 116 to complete the cycle. The fluid circulating through the condenser 106 can be water or any other suitable liquid.

In some embodiments, the refrigerant has an operating pressure of less than 400 kPa or approximately 58 psi. In further embodiments, the refrigerant is R1233zd. R1233zd is a non-flammable fluorinated gas with low Global Warming Potential (GWP) relative to other refrigerants utilized in commercial chiller assemblies. GWP is a metric developed to allow comparisons of the global warming impacts of different gases, by quantifying how much energy the emissions of 1 ton of a gas will absorb over a given period of time, relative to the emissions of 1 ton of carbon dioxide.

Figure 3:
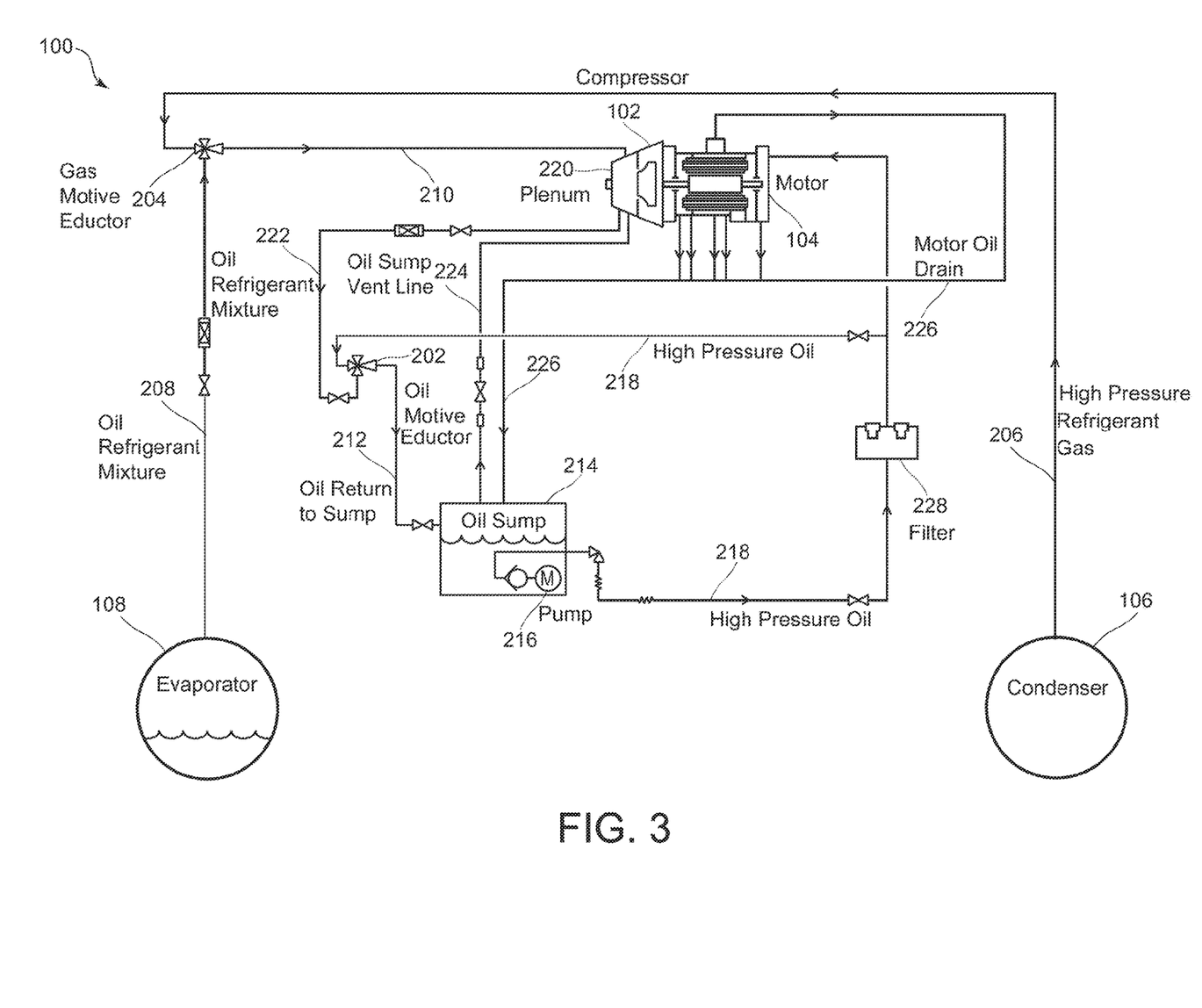
FIG. 3 is a schematic drawing of a two step oil motive eductor system used in the chiller assembly of FIG. 1, according to some embodiments.

Referring now to FIG. 3, a schematic drawing of an example two step oil motive eductor system is depicted. The two step system can include both an oil motive eductor 202 and a gas motive eductor 204. The system may operate as follows: an oil and refrigerant mixture may be suctioned out of the condenser 108 by a gas motive eductor 204. The oil and refrigerant mixture line 208 may transport a mixture having a range of 0.5 to 2% oil and 98 to 99.5% refrigerant by weight. The motive fluid that generates the suction force through the gas motive eductor 204 may be highly pressurized refrigerant gas 206 supplied from condenser 106.

After exiting the gas motive eductor 204 via line 210, the oil and refrigerant mixture may be propelled to a plenum region 220 of the compressor 102. The plenum region 220 is one of the lowest pressure regions in the chiller assembly 100, and can share a wall with a discharge or volute portion of the compressor (shown in further detail with reference to FIG. 4 below). In some embodiments, the wall between the plenum region 220 and the discharge portion may be fabricated from cast iron. The combination of low pressure and heat conducted across the wall to the plenum region 200 may cause a portion of the refrigerant in the oil and refrigerant mixture to boil off in the compressor plenum region 220. In addition to the increase in oil concentration due to the evaporation of refrigerant, the plenum region 220 may act as a natural collector for oil droplets, which may blend with the oil and refrigerant mixture and further increase the relative oil concentration in the oil and refrigerant mixture. For example, in some embodiments, the highly concentrated oil mixture collected in the plenum region 220 may have a range of 33-50% oil and 50-67% refrigerant.

The highly concentrated oil mixture may be discharged from the plenum region 220 via line 222 into a suction inlet of an oil motive eductor 202. The highly concentrated oil mixture may be propelled through the oil motive eductor 202 by a high pressure motive oil delivered via line 218. The oil motive eductor 202 may discharge the highly concentrated oil mixture to an oil sump 214 via a discharge line 212.

The oil sump 214 may act as a reservoir for the collection of lubricating oil and may include a submerged oil pump 216. The submerged oil pump 216 may be configured to discharge pressurized lubricating oil from the sump 214 by utilizing suction generated by the surrounding oil collected in the sump 214. In various embodiments, the oil pump 216 may be configured to operate at all times during chiller operation and may operate at a consistent pressure regardless of the refrigerant head pressure, resulting in a stable motive fluid supplied to the oil motive eductor 202. Oil discharged from the oil sump 214 may pass through a filter 228 before diverging along two separate paths. A first portion of the pressurized oil is delivered to the motor 104 for the purpose of lubricating the rotating components of the motor 104 before returning to the oil sump 214 by motor oil drain lines 226. As described above, a second portion of the pressurized oil is delivered to the oil motive eductor 202 to act as a motive fluid for the highly concentrated oil and refrigerant mixture exiting the plenum region 220 via line 222.

The two step oil motive eductor system is further shown to include an oil sump vent line 224 that fluidly couples the oil sump 214 to the compressor 102. The oil sump vent line 224 may be configured to discharge refrigerant vapor from the oil sump 214. As compared with higher pressure refrigerants, a low pressure refrigerant (e.g., R1233zd) requires a greater quantity of refrigerant to be vented from the oil sump 214 in order to ensure optimal operation of the oil sump 214 and oil pump 216. By supplying the oil sump 214 with a highly concentrated oil mixture from the oil motive eductor 202 via line 212, the amount of refrigerant supplied to the oil sump 214 is minimized, and the size (e.g., diameter) of the oil sump vent line 224 may be correspondingly minimized.

Figure 4:
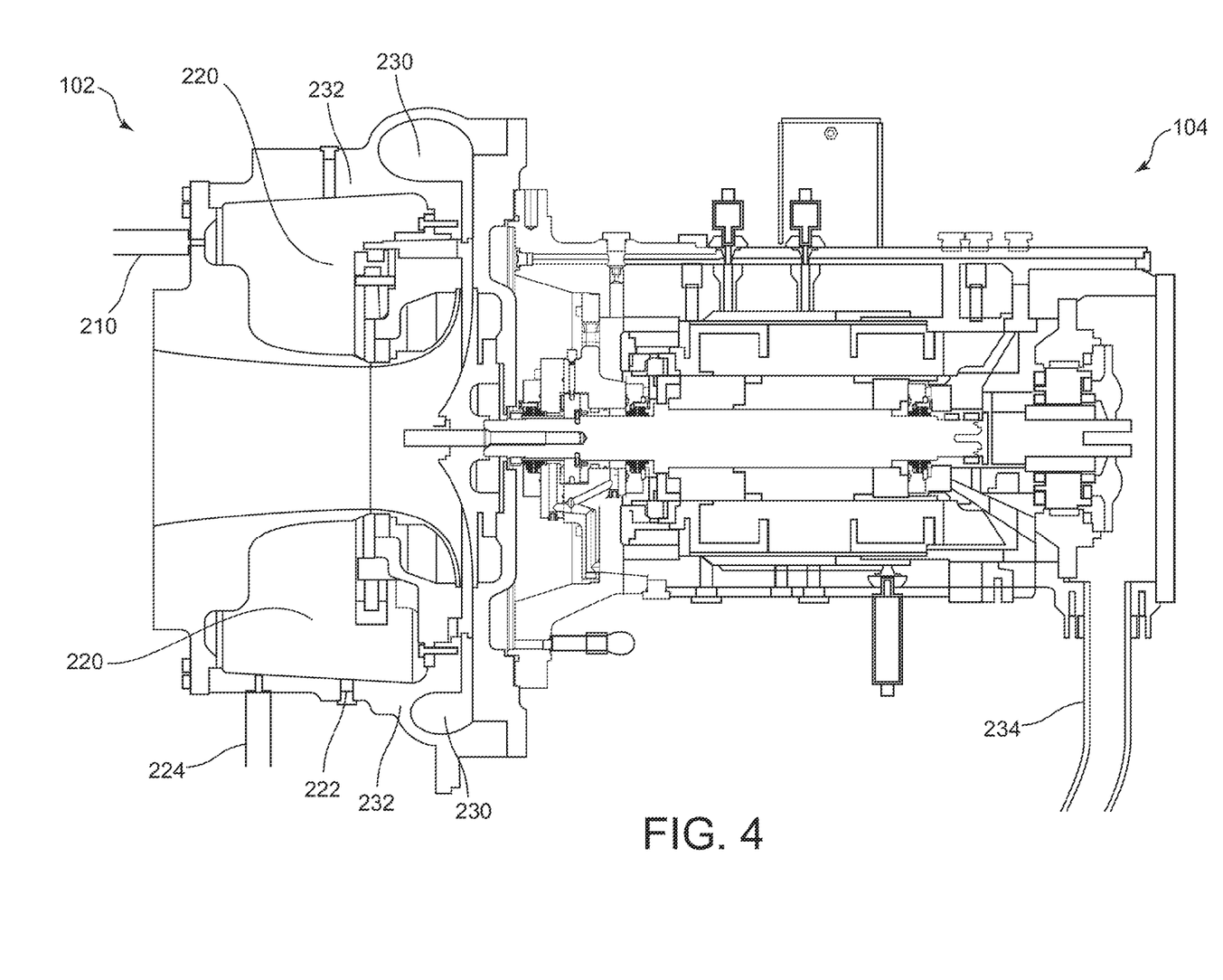
FIG. 4 is a sectional view drawing of a motor and compressor that can be utilized in the two step system of FIG. 3, according to some embodiments.

Referring now to FIG. 4, a sectional view drawing of a compressor 102 and a motor 104 that can be utilized in the two step system of FIG. 3 is shown, according to some embodiments. As described above, the motor 104 is a hermetically sealed high speed induction motor, while the compressor 102 is a centrifugal compressor. In other embodiments, the chiller assembly 100 may include a different type of motor and/or type of compressor.

The compressor 102 includes a plenum region 220. The plenum region 220 receives heat from the discharge or volute portion 230 of the compressor 102, and thus may provide a convenient region to boil off excess refrigerant in the oil and refrigerant mixture discharged from the gas motive eductor 204 and received using line 210. Heat may conducted by the plenum wall 232, which may be fabricated from cast iron. In other embodiments, the components of the compressor 102, including the plenum wall 232, may be fabricated from another suitable material. After the excess refrigerant has been boiled off in the plenum region 220, the resulting oil and refrigerant mixture may be discharged from the compressor 102 using line 222. The compressor 102 and motor 104 assembly depicted in FIG. 4 is further shown to include two vent lines. Oil sump vent line 224 may discharge excess refrigerant vapor from the oil sump to the plenum region 220, while motor housing vent line 234 may discharge excess refrigerant vapor from the housing of motor 104 to the evaporator.

Figure 5:
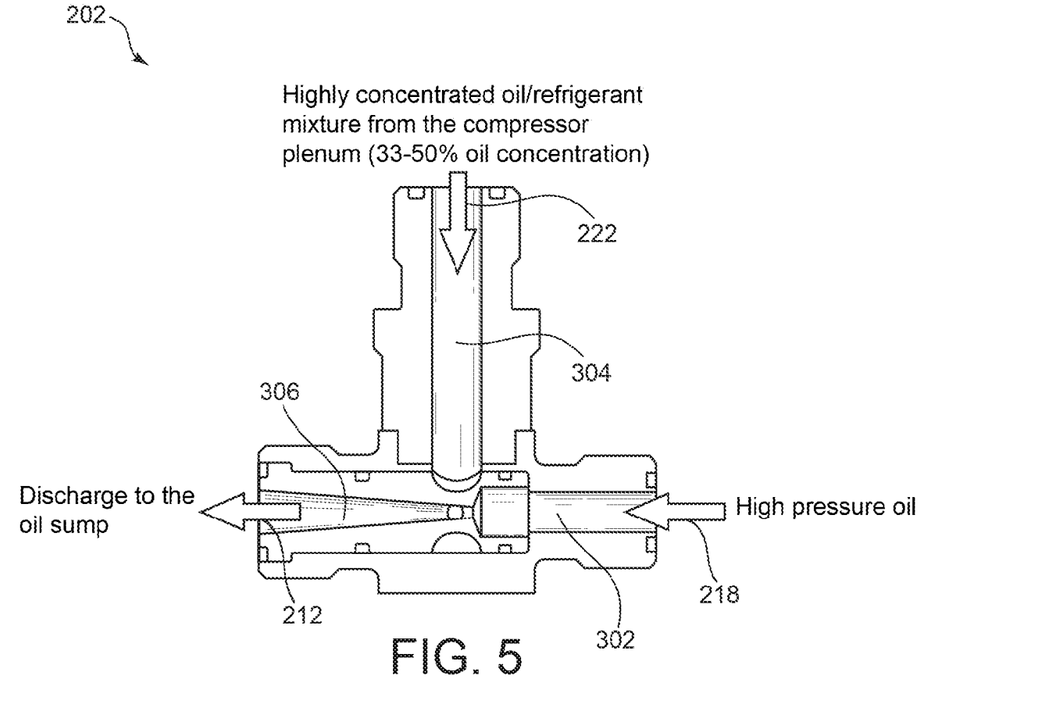
FIG. 5 is a sectional view drawing of an oil motive eductor used in the two step system of FIG. 3, according to some embodiments.

FIG. 5 is a sectional view drawing of the oil motive eductor 202 that can be used in the two step system of FIG. 3. Oil motive eductor 202 is shown to include a motive inlet 302, a suction inlet 304, and a diffuser outlet 306. Motive inlet 302 receives high pressure oil from the oil sump 214 via line 218, while suction inlet 304 receives a highly concentrated oil and refrigerant mixture from the compressor plenum 220 via line 222. In some implementations, the highly concentrated oil and refrigerant mixture received via line 222 includes a range of 33-50% oil and 50-67% refrigerant. Diffuser outlet 306 subsequently discharges a mixture of the highly concentrated oil and refrigerant mixture and the motive oil back to the oil sump 214 via line 212.

Figure 6:
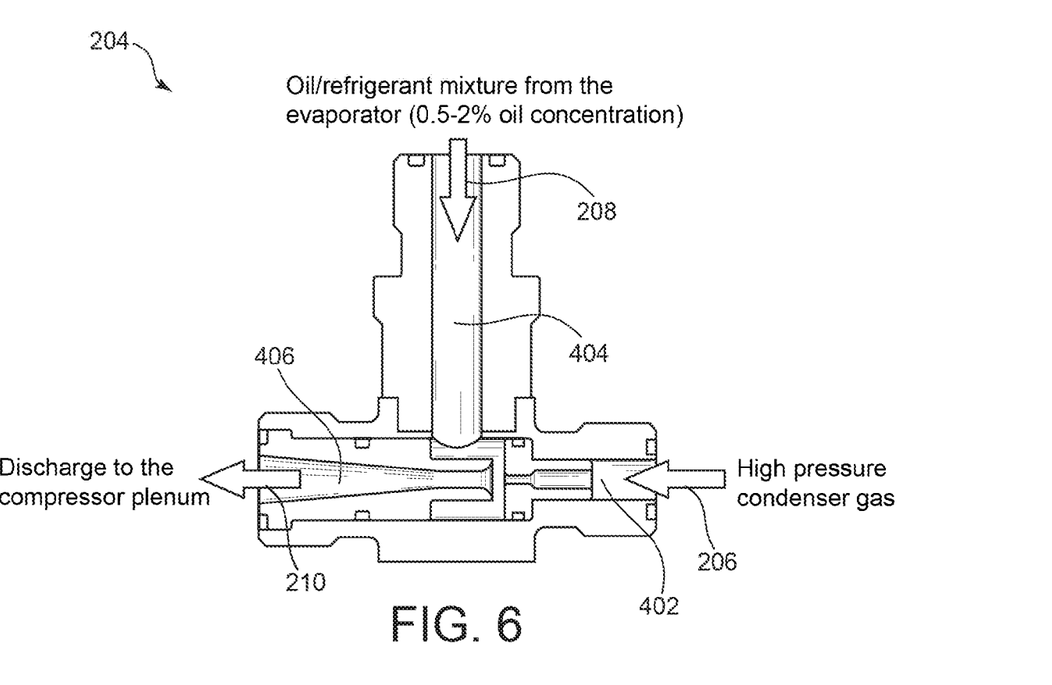
FIG. 6 is a sectional view drawing of a gas motive eductor used in the two step system of FIG. 3, according to some embodiments.

FIG. 6 is a sectional view drawing of the gas motive eductor 204 that can be used in the two step system of FIG. 3. Similar to the oil motive eductor 202 described above with reference to FIG. 5, the gas motive eductor 204 includes a motive inlet 402, a suction inlet 404, and a diffuser outlet 406. Motive inlet 402 receives high pressure refrigerant gas from the condenser 106 via line 206, while suction inlet 404 receives an oil and refrigerant mixture from the evaporator 108 via line 208. As described above, in some implementations, the oil and refrigerant mixture received via line 208 includes a range of 0.5-2% oil and 98-99.5% refrigerant. Diffuser outlet 406 subsequently discharges a mixture of the oil and refrigerant and the condenser gas to the compressor plenum 220 via line 210.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. An eductor system for a chiller assembly comprising:
a first eductor, comprising:
a first suction inlet fluidly coupled to a plenum of a compressor to receive a first oil and refrigerant mixture from the plenum of the compressor;
a first motive inlet fluidly coupled to an oil sump to receive a first motive fluid from the oil sump; and
a first outlet fluidly coupled to the oil sump to discharge a first outlet mixture to the oil sump, the first outlet mixture comprising the first oil and refrigerant mixture and the first motive fluid; and
a second eductor, comprising:
a second suction inlet fluidly coupled to an evaporator to receive a second oil and refrigerant mixture from the evaporator;
a second motive inlet fluidly coupled to a condenser to receive a second motive fluid from the condenser; and
a second outlet fluidly coupled to the plenum of the compressor to discharge a second outlet mixture to the plenum of the compressor, the second outlet mixture comprising the second oil and refrigerant mixture and the second motive fluid.

2. The eductor system of claim 1, wherein the first motive fluid comprises pressurized oil.

3. The eductor system of claim 1, wherein the second motive fluid comprises a pressurized refrigerant gas.

4. The eductor system of claim 1, wherein a percentage of oil in the first oil and refrigerant mixture ranges from 33% to 50%.

5. The eductor system of claim 1, wherein a percentage of oil in the second oil and refrigerant mixture ranges from 0.5% to 2%.

6. The eductor system of claim 1, wherein a refrigerant of the first oil and refrigerant mixture, the second oil and refrigerant mixture, or both is R1233zd.

7. A chiller assembly, comprising:
a centrifugal compressor driven by a hermetically sealed induction motor;
a condenser;
an evaporator; and
an oil motive eductor system, comprising:
an oil sump;
a first eductor comprising a first suction inlet, a first motive inlet configured to receive a first motive fluid from the oil sump, and a first outlet; and
a second eductor comprising a second suction inlet, a second motive inlet configured to receive a second motive fluid comprising a pressurized refrigerant gas from the condenser, and a second outlet,
wherein the centrifugal compressor, the condenser, and the evaporator are connected in a closed refrigerant loop.

8. The chiller assembly of claim 7, wherein the first suction inlet is configured to receive a first oil and refrigerant mixture from a plenum of the centrifugal compressor.

9. The chiller assembly of claim 8, wherein a percentage of oil in the first oil and refrigerant mixture ranges from 33% to 50%.

10. The chiller assembly of claim 8, wherein the first outlet is configured to discharge a first outlet mixture to the oil sump, the first outlet mixture comprising the first oil and refrigerant mixture and the first motive fluid.

11. The chiller assembly of claim 7, wherein the first motive fluid comprises pressurized oil.

12. The chiller assembly of claim 7, wherein the second suction inlet is configured to receive a second oil and refrigerant mixture from the evaporator.

13. The chiller assembly of claim 12, wherein a percentage of oil in the second oil and refrigerant mixture ranges from 0.5% to 2%.

14. The chiller assembly of claim 12, wherein the second outlet is configured to discharge a second outlet mixture to a plenum of the centrifugal compressor, the second outlet mixture comprising the second oil and refrigerant mixture and the second motive fluid.

15. The chiller assembly of claim 7, wherein a refrigerant of the first oil and refrigerant mixture, the second oil and refrigerant mixture, or both is R1233zd.

16. The chiller assembly of claim 7, wherein the centrifugal compressor comprises a plenum region, a volute portion, and a wall extending between the plenum region and the volute portion, wherein the plenum region is configured to receive an oil and refrigerant mixture from the second educator, the plenum region is separate from the oil sump, and the wall is configured to conduct heat from the volute portion to the plenum region to evaporate refrigerant in the oil and refrigerant mixture.

17. A chiller assembly, comprising:
a compressor driven by a motor, wherein the compressor comprises a plenum;
a condenser;
an evaporator; and
an oil motive eductor system, comprising:
an oil sump separate from the plenum;
a first eductor comprising:
a first suction inlet configured to receive a first oil and refrigerant mixture from the plenum of the compressor;
a first motive inlet configured to receive a pressurized oil motive fluid from the oil sump; and
a first outlet configured to discharge a first outlet mixture comprising the first oil and refrigerant mixture and the pressurized oil motive fluid to the oil sump; and
a second eductor comprising a second suction inlet, a second motive inlet, and a second outlet,
wherein the compressor, the condenser, and the evaporator are connected in a closed refrigerant loop.

18. The chiller assembly of claim 17, wherein the second suction inlet is configured to receive a second oil and refrigerant mixture from the evaporator, the second motive inlet is configured to receive a second motive fluid from the condenser, and the second outlet is configured to discharge a second outlet mixture to the plenum of the compressor.

19. The chiller assembly of claim 18, wherein the second motive fluid comprises pressurized refrigerant gas.

20. The chiller assembly of claim 18, wherein a first percentage of oil in the first oil and refrigerant mixture ranges from 33% to 50%, and wherein a second percentage of oil in the second oil and refrigerant mixture ranges from 0.5% to 2.0%.

* * * * *